United States Patent [19]
Yamaguchi et al.

[11] 4,345,558
[45] Aug. 24, 1982

[54] KNOCK DETECTING APPARATUS FOR AN INTERNAL COMBUSTION ENGINE

[75] Inventors: Hiroaki Yamaguchi, Anjo; Tadashi Hattori; Yoshinori Ootsuka, both of Okazaki, all of Japan

[73] Assignee: Nippon Soken, Inc., Nishio, Japan

[21] Appl. No.: 135,929

[22] Filed: Mar. 31, 1980

[30] Foreign Application Priority Data

Apr. 28, 1979 [JP] Japan .................................. 54/53143
Jun. 15, 1979 [JP] Japan .................................. 54/76009

[51] Int. Cl.³ .............................................. F02D 5/04
[52] U.S. Cl. ...................................... 123/425; 73/35
[58] Field of Search ............... 123/425, 435, 415, 416; 73/35

[56] References Cited
U.S. PATENT DOCUMENTS

4,061,116 12/1977 Saida et al. ......................... 123/425
4,233,836 11/1980 Yoneda et al. ......................... 73/35

FOREIGN PATENT DOCUMENTS

55-144520 11/1980 Japan ..................................... 73/35

Primary Examiner—Tony M. Argenbright
Attorney, Agent, or Firm—Cushman, Darby & Cushman

[57] ABSTRACT

The vibrations produced by the knocking in an engine and having frequencies in different frequency bands are detected by a vibration detector having a plurality of resonance frequencies. One of the detection outputs of the vibration detector is selected by a switching circuit or a filter circuit in accordance with the operating conditions of the engine. The ignition timing of the engine is corrected in accordance with the selected detection output.

6 Claims, 18 Drawing Figures

KNOCK DETECTING APPARATUS FOR AN INTERNAL COMBUSTION ENGINE

BACKGROUND OF THE INVENTION

This invention relates to a knock detecting apparatus adapted for use with internal combustion engine ignition timing control systems and having the function of detecting knocking of an engine from the vibrations caused inside and outside the engine cylinders due to the cylinder pressure and adjusting the ignition timing.

The existence of a close correlation between the ignition timing and the cylinder pressure is well known in the art. When the mixture is exploded, if there is no knocking, there will be no superposition on the cylinder pressure of higher harmonics (those including components of a frequency band which is usually determined by the diameter of the engine cylinder bore and the velocity of sound in combustion and the harmonics are produced by the intermittent and rapid burning of the mixture). If the engine starts knocking, such harmonic components start to be superposed on the cylinder pressure when the crank angle reaches around the point of the maximum cylinder pressure value and this results in the production of vibrations or sound on the outside of the cylinders. A study of the cylinder pressure signals generated inside the cylinders as well as the manner of production of vibrations or sound outside the cylinders has shown that the beginning of knocking (or trace knock) starts occurring at the engine crank angle at which the cylinder pressure attains the maximum value, and when the knock gradually increases in intensity (to light knock and heavy knock) such harmonic components start to be superposed greatly on the cylinder pressure on the advanced side (or on the ignition side) with respect to the maximum value cylinder crank angle.

In this case, it has been considered that the frequencies of the higher harmonics due to the knocking are determined linearly with the cylinder bore diameter and the velocity of sound in combustion and it has been said that the frequencies occur only in a specified frequency band (usually in the range of 7 to 10 kHz). Knock detecting apparatus known in the art are so designed that the ignition timing is controlled by detecting the occurrence of knocking on the understanding that the knock can be detected by simply detecting the vibrations produced outside the engine or noting only the specified frequencies. However, it has been determined that the detection accuracy of this type of apparatus tends to deteriorate depending on the operating conditions of the engine and there is a certain region where the detection of weak or trace knock is difficult. More specifically, if the knock is detected from the frequencies in the 7 to 10 kHz band, at the high speed operation of the engine the resulting vibration noise (e.g., the valve seating vibration) in the engine body increases and the S/N ratio is deteriorated. The effect of these phenomena is so large that particularly during the periods of high speed and load operation, the detection of trace knock will be made practically impossible. If the control of the ignition timing is enforced despite the deteriorated S/N ratio, an excessively intense knock will be caused and sometimes damages to the engine body including burning loss of the spark plugs will be caused. In the past, generally it has been necessarily to stop the ignition timing control during the periods of high speed and high load operation so as to prevent such damages. In the case of known methods in which the detection of vibrations is simply attempted without noticing any specific frequency band, the effect of vibration noise has been so large that the detection of trace knock has been practically impossible and thus it has been impossible to expect smooth control of the ignition timing.

Examination of various knock detecting methods designed to overcome the deficiencies in the known methods has shown that knocking frequencies are not confined to any single frequency band but knocking occurs in a plurality of frequency bands, and that if these frequency bands are taken into consideration, it will be possible to reduce the danger of superposition of engine vibration noise and to effect the detection of knock even during the periods of high speed operation with greater accuracy.

SUMMARY OF THE INVENTION

It is the object of the present invention to provide a knock detecting apparatus for internal combustion engines which is capable of accurately detecting the occurrence of knock even during the high load and high speed operation and greatly improving the engine durability and efficiency.

BRIEF DESCRIPTION OF THE DRAWINGS

FIGS. 3A to 3D show an embodiment of the vibration detector used in the apparatus of this invention, in which

DESCRIPTION OF THE PREFERRED EMBODIMENTS

Figure 1:
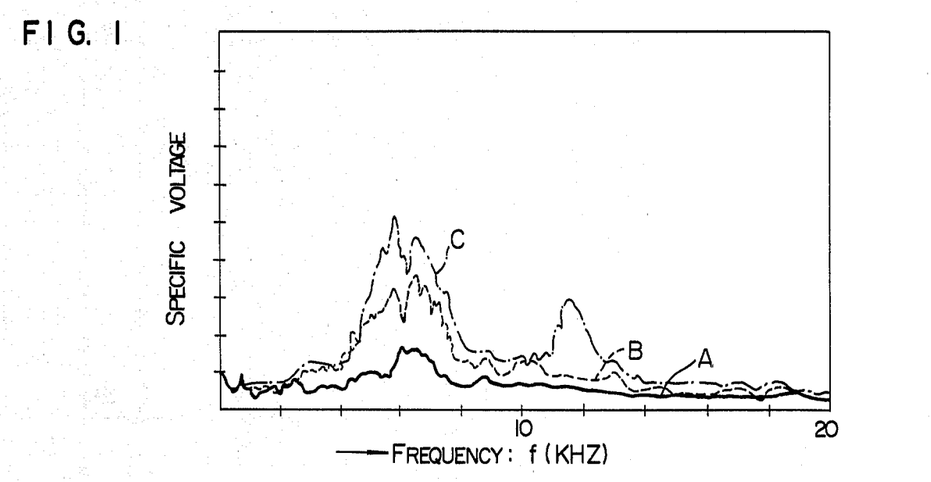
FIG. 1 is a diagram showing an analysis of the vibration frequencies caused by knocking in a particular engine.

FIG. 1 is a diagram showing a frequency analysis of the vibration outputs of a piezoelectric element vibration detector attached to the cylinder block of an engine under the knocking and non-knocking conditions.

In the Figure, the curves A and B show respectively the non-knocking vibration output (background noise) under the high load operation (WOT) at the engine speeds of 1500 rpm and 3000 rpm, and the curve C indicates the knocking vibration output at the engine speed of 3000 rpm under the WOT operation.

As will be seen from the results of this analysis, the knock occurred in a band of 5 to 10 kHz (hereinafter referred to as a low frequency band) and in another band of 11 to 13 kHz (hereinafter referred to as a high frequency band), and in the band of 11 to 13 kHz the effect of vibration noise was reduced with the resulting improved S/N ratio during the periods of highspeed operation. On the contrary, in the low frequency band an improved sensitivity was obtained at the low speed operation. In addition to the results of FIG. 1, it has been shown that the vibrations in the high frequency band also have a greater tendency to occur when the crank angle is near the peak of the cylinder combustion pressure and the vibrations in the low frequency band have a greater tendency to occur after the peak of the cylinder combustion pressure. These results coincide excellently with the cylinder pressure waveforms showing that the knocking frequencies cannot be determined linearly as was believed in the art and there are specific combustion regions. Further, although the low and high frequency bands are also influenced by the shape and conditions of the combustion chambers so that there will be cases where these frequency bands cannot be determined absolutely depending on the type of engines, it is doubtless that knock occurs in a plurality of frequency bands.

Under these circumstances, in accordance with the invention there is thus provided a knock detecting apparatus for an internal combustion engine in which a plurality of resonance frequencies are used which are respectively associated with the previously mentioned different frequency bands and the outputs of a sensor which are associated with the plurality of resonance characteristics are selectively generated in accordance with the engine conditions in response to the occurrence of engine vibration noise, whereby during the periods of low engine speed and load operation where the occurrence of engine vibration noise is relatively less, the sensitivity and S/N ratio of the low frequency band are satisfactory and the detection of knock is possible, the resonance characteristic associated with the low frequency band is selected, whereas when the engine comes into a high speed or high load operation so that the vibration noise increases, the resonance characteristic associated with the high frequency band is selected, and in this way the detection of trace knock is always accomplished stably and accurately against changes in the operating conditions.

The present invention will now be described with reference to the illustrated embodiments.

Figure 2:
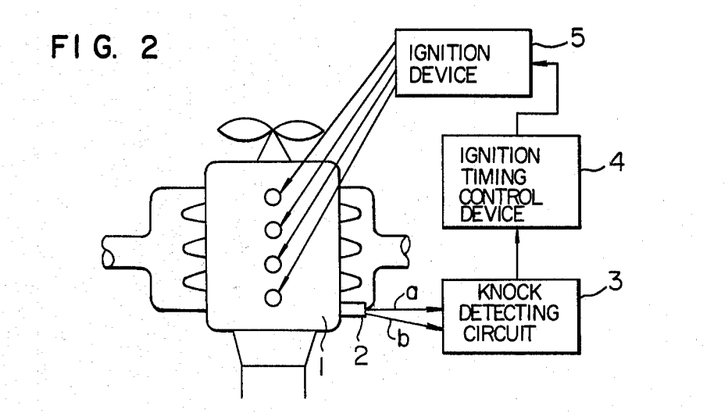
FIG. 2 is a schematic diagram showing the construction of a first embodiment of a knock feedback ignition system incorporating the apparatus according to the invention.

Referring to FIG. 2, there is illustrated a schematic diagram showing a first embodiment of a knock feedback ignition system incorporating a knock detecting apparatus according to the invention. In the Figure, numeral 4 designates a four-cylinder in-line engine, and a vibration detector 2 is firmly mounted to the cylinder block (on the No. 4 cylinder side in the illustration) of the engine 1 by means of a screw or the like. The vibration detector 2 has two resonance frequencies associated with different frequency bands and the resulting vibration outputs in the frequency bands are respectively generated from two signal lines a and b. Numeral 3 designates a knock detecting circuit for detecting knocking of the engine from the output signal of the vibration detector 2, and 4 an ignition timing control device responsive to the output of the detecting circuit 3 to advance or retard the ignition timing and thereby to control it at the optimum position. The output signal of the control device 4 is supplied through an ignition device 5 to the spark plugs mounted in the engine 1 to thereby ignite the mixture.

Next, the construction of the vibration detector 2 will be described in detail. FIG. 3 shows a first embodiment of the vibration detector employing two piezoelectric elements. In the Figure, numerals 21A and 21B (FIG. 3B) designate two piezoelectric vibration detecting elements which are called as bimorph cells each comprising two piezoelectric members 21a and 21b cemented together with a center electrode 21c interposed therebetween. Each of the vibration detecting elements 21A and 21B is held, along with an outer electrode 21d connecting the upper and lower piezoelectric members 21a and 21d with each other, between two insulators 22a and 22b made of ceramic, Bakelite or the like and having recesses, and the assembly is firmly mounted to a metal stay 29 by screws 23. The signals from the vibration detecting elements 21A and 21B are taken to the outside through lead wires 24a, 24b, 25a and 25b connected to the ends of the center electrodes 21c and the outer electrodes 21d by soldering, caulking or the like and through the four electrodes of a sealed terminal 26 (generally called as a hermetic seal) constructed by insulating the electrodes with glass. The terminal 26 is soldered to a metal cover 27 by means of its metal housing 26a, and the cover 27 is mounted, along with a sealing member 28 made of rubber or the like, to the stay 29 by caulking the end of the cover 27. The stay 29 includes in its lower portion a mounting threaded portion 29a which in turn is mounted firmly to the engine cylinder block. The sensing direction of the vibration detector 2 is the vertical direction shown by the arrow in FIG. 3A. Since the vibration detecting elements 21A and 21B incorporated in the detector 2 are the same in material and construction, their resonance frequencies are determined by their lengths. In the Figure, the vibration detecting elements 21A and 21B are so designed that the shorter vibration detecting element 21B has a higher resonance frequency, that is, the resonant peak of the vibration detecting element 21A occurs at 8 kHz and that of the vibration detecting element 21B occurs at 12 kHz. Full consideration is given to the insulation between the vibration detecting elements 21A and 21B.

Figure 3A:
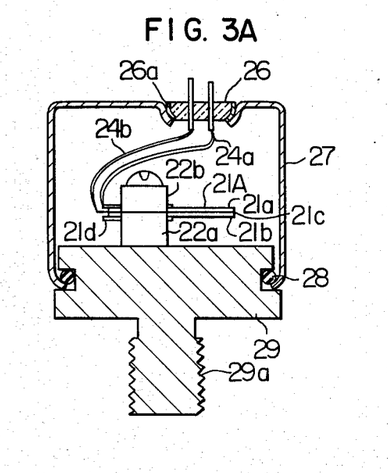
FIG. 3A is a longitudinal sectional view.
Figure 3B:
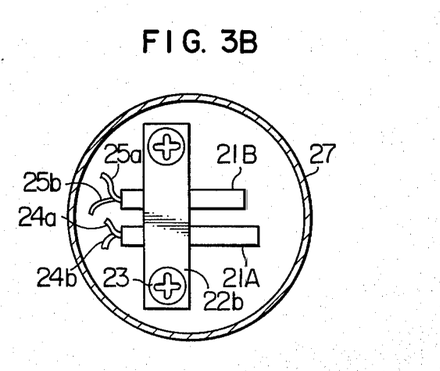
FIG. 3B is a cross-sectional view.
Figure 3C:
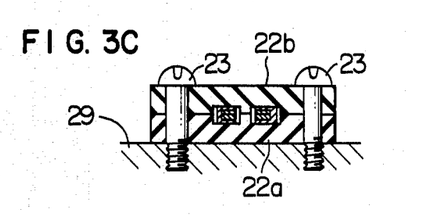
FIG. 3C is a principal longitudinal view.
Figure 3D:
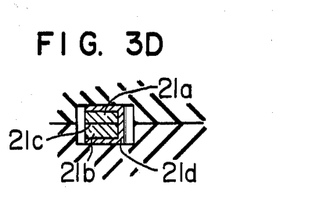
FIG. 3D is a principal enlarged longitudinal sectional view.

Each of the vibration detecting elements 21A and 21B has a resonance characteristic at a particular frequency. Thus the sensitivity to the vibration frequencies around such particular frequency is excellent and the S/N ratio for the noise in other frequency bands is improved considerably.

The operation of the vibration detector 2 is as follows. When the detector 2 is mounted to the cylinder block and the engine is operated, a force is applied to the vibration detecting elements 21A and 21B in the direction of the arrow shown in FIG. 3A and each of the elements generates an output corresponding to the force. Since the vibration detecting elements 21A and 21B are arranged electrically independent of each other, when vibrations are produced, the vibration detecting element 21A responds with a high sensitivity to the knock in the low frequency band, and the vibration detecting element 21B responds excellently to the knock in the high frequency band. While the vibration detecting elements 21A and 21B are different in knocking vibration frequency according to the engine conditions and they also differ in S/N ratio, the use of a switching circuit 31 makes it possible to use the output of one of the elements having an excellent S/N ratio, and in this way the detection of knock can always be effected properly.

As a result, the disadvantage of the prior art detecting methods, that is, deterioration of the S/N ratio at the high speed operation as well as the high speed and high load operation is eliminated and the detection of trace knock can be effected satisfactorily.

Figure 4:
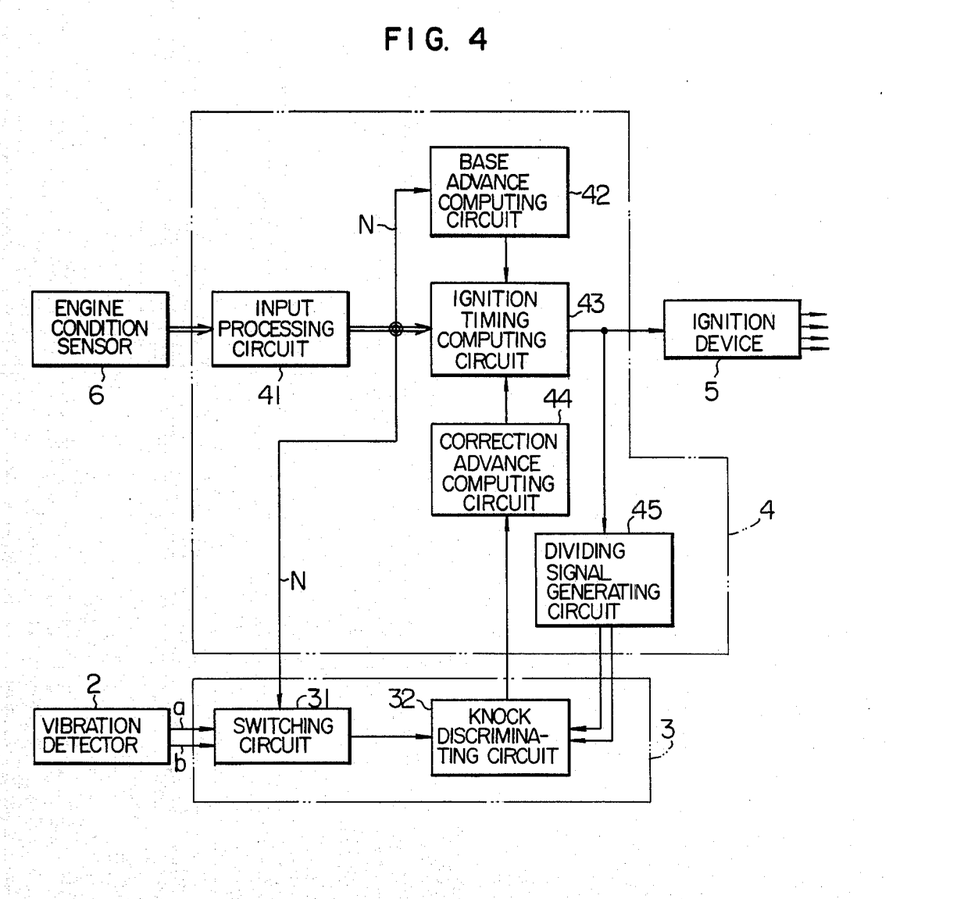
FIG. 4 is a detailed block diagram for the principal parts of the system shown in FIG. 2.

FIG. 4 is a detailed block diagram for the knock detecting circuit 3 and the ignition timing control device 4.

In the Figure, numeral 6 designates an engine condition sensor adapted to sense one or more of the engine speed, load condition, temperature, etc. Numeral 41 designates an input processing circuit for converting the sensed engine condition signal or signals to a form suitable for use in the computation of ignition timing, and 42 a base advance computing circuit whereby in accordance with the engine speed of the engine conditions (for example, by providing a plurality of projections on the rotating part such as the distributor shaft or the crankshaft and detecting and converting the engine speed to a digital signal by means of a dynamometer method employing a magnet and coil, it is possible to generate a signal having a frequency proportional to the engine speed), a predetermined advance angle is determined which will be varied only in dependence on the engine speed (e.g., the minimum advance angle or an advance control range for fail-safe). Numeral 43 designates an ignition timing computing circuit responsive to the outputs of the base advance computing circuit 42 and the input processing circuit 41 and the output of a correction advance computing circuit 44 for determining a correction advance angle in accordance with the knocking condition so as to determine the optimum ignition timing for the engine operation. Numeral 45 designates a dividing signal generating circuit responsive to the ignitor actuation signal from the ignition timing computing circuit 43 (e.g., a digital signal indicative of the duration of energization of the ignition coil or the ignition timing) so as to divide the time interval immediately after each ignition into a predetermined interval L having no knocking tendency and another interval where the occurrence of knock is possible and thereby to detect the knock and base vibration noise through a knock discriminating circuit 32 which will be described later. Numeral 5 designates the previously mentioned known type of ignition device responsive to the output of the ignition timing computing circuit 43 for energizing the ignition coil which is not shown so as to cause a high voltage produced in the secondary winding to jump to the proper spark plug and thereby to ignite and burn the mixture. Numeral 2 designate the previously mentioned vibration detector 3, the knock detecting circuit, 31 the switching circuit for selecting one or the other of the two signals from the vibration detector 2 in accordance with the output of the input processing circuit 41, and 32 the knock discriminating circuit responsive to the output of the dividing signal generating circuit 45 so as to compare in predetermined timed relation a vibration noise with a knock output and thereby to determine the presence of knock.

Figure 5:
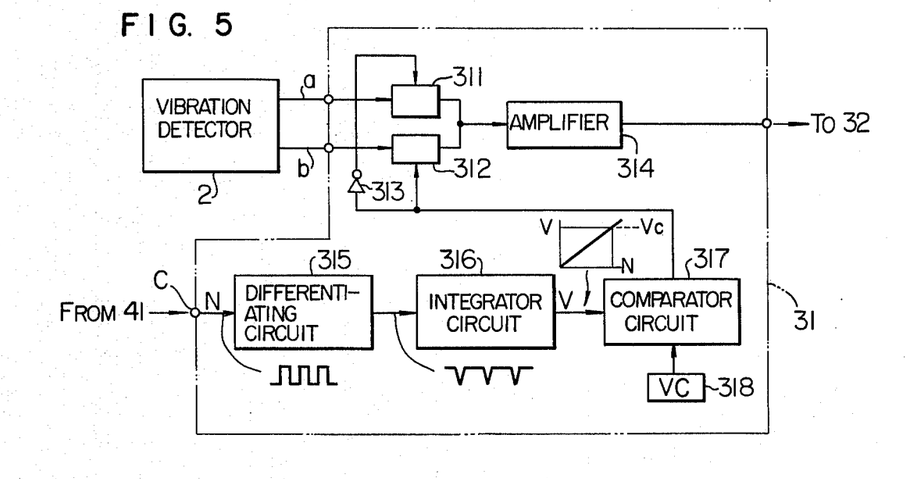
FIGS. 5 and 6 are detailed block diagrams showing two exemplary forms of the switching circuit 31 shown in FIG. 4.

FIG. 5 is a detailed block diagram of the switching citcuit 31, in which numeral 2 designates the vibration detector, and a and b the output lines for the high-frequency and low-frequency band outputs of the detector 2. Numerals 311 and 312 each designates an analog switch adapted to be turned on in response to the application of a "1" level signal to its control terminal, and one or the other of the analog switches is turned on in response to the output of a comparator circuit 317 and the output of a NOT gate 313. Numeral 314 designates an amplifier for amplifying the output of the vibration detector 2 which is passed by the analog switch 311 or 312. Of the digital signals generated from the input processing circuit 41, the one proportional to the engine speed N is applied to a terminal C so that an analog voltage proportional to the engine speed N is generated through a differentiating circuit 315 and an integrator circuit 316. Numeral 317 designates the previously mentioned compartor circuit for comparing the output of a voltage setting means 318 with the output of the integrator circuit 316.

With the construction described above, the operation of the ignition system is as follows. This ignition system performs a base advance function which is dependent on the engine speed whereby when any malfunction of the engine occurs, irrespective of the ordinary ignition means, the minimum operation is maintained while preventing damages to the engine (this function is used in such cases where the ignition system is caused to malfunction, any abnormal knock is caused by some reason or other and so on), the ordinary advance function which is deendent on the engine speed, load, water temperature, etc., and another advance function which is dependent on the presence and absence of knock to advance or retard the ignition timing. Thus the desired ignition timing is computed and determined as the combined result of these functions. When the timing of spark ignition is determined in the conventional manner and the ignition is effected by the engine, the vibration detector 2 generates two signals respectively corresponding to two types of vibrations, each having a resonant frequency in one of two different frequency bands. Thus, in the switching circuit 31, the output of the differentiating circuit 315 and hence the output of the integrator circuit 316 increases in proportion to the engine speed so that the comparator circuit 317 compares the output V of the integrator 316 with the preset voltage $V_c$ of the voltage setting means 318 to determine whether the engine speed is higher than a predetermined speed (3000 rpm in this embodiment). When the speed voltage V is higher than the preset voltage $V_c$ ($V > V_c$), the output of the comparator circuit 317 goes to a "0" level so that the analog switch 311 is turned on and the high-frequency band output signal of the vibration detector 2 is applied to the amplifier 314. As a result, the high-frequency band signal (the resonant frequency is 12 kHz) of the engine body having a reduced vibration noise and an improved S/N ratio, is applied to the knock discriminating circuit 32 and the knock is detected with improved accuracy. On the contrary, when $V > V_c$, the output of the comparator circuit 317 goes to the "1" level so that the analog switch 312 is turned on and the knock discriminating circuit 32 receives the low-frequency band signal (the resonant frequency is 8 kHz) having a relatively low vibration noise and a knocking vibration detectable with a high degree of sensitivity. Thus, when the speed increases so that the engine vibration noise increases, the high-frequency band signal having an improved signal sensitivity is applied, whereas when the engine speed is low so that only low vibration noise is present even in the low frequency band (5 to 10 kHz), the low-frequency band signal having an excellent sensitivity to knock is applied, and in this way the knock discriminating circuit 32 is always allowed to detect the knock with an excellent S/N ratio.

Figure 7:
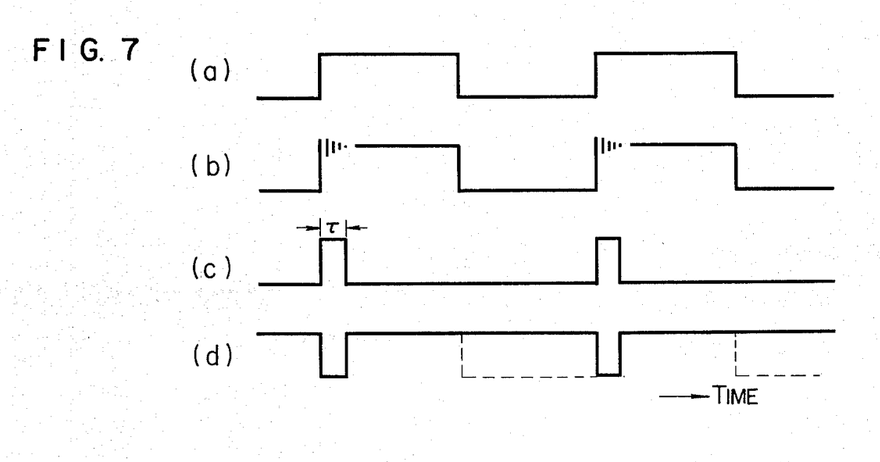
FIG. 7 is a signal waveform diagram useful in explaining the operation of the dividing signal generating circuit 45 showing in FIG. 4.

The knock discriminating circuit 32 (FIG. 4) samples the output of the detector 2 in response to the output of the dividing signal generating circuit 45 by dividing it into the vibration noise sampling signal shown in (c) of FIG. 7 and generated during the time interval just after each ignition and the knock sampling signal shown by the solid or dotted line in (d) of FIG. 7 and generated during the following knocking time interval. (In the Figure, shown in (a) is the waveform of the output signal from the ignition timing computing circuit 43 and shown in (b) is the output waveform of the power transistor which interrupts the primary current flow in the ignition coil of the ignition device 5.) The peak value and the rectified and integrated values of the signals are respectively obtained so that the two signals are compared or the relative magnitude in potential is obtained (in this case, however, the level of the noise is lower than that of the knock signal and thus the discrimination is made on the basis of K X (noise)≧knock), so that when the knock is greater than a predetermined value, it is determined that the knock is present, and the correction advance computing circuit 44 computes an advance/retard correction amount in accordance with the level of the knock.

The ignition timing computing circuit 43 then adds this knock correction amount to the advance angle computed in accordance with the engine conditions, and in accordance with the resulting advance angle the ignition device 5 is actuated to effect the ignition. In this case, if no knock is present, the correction advance computing circuit 44 generates a signal to advance the ignition timing by a predetermined amount. More specifically, the ignition system is designed so that in accordance with the output of the detector 2, the ignition timing is retarded by a predetermined amount when knock occurs, whereas the ignition timing is advance by the predetermined amount when there is no knock, and when any malfunction of the engine occurs the ignition timing is controlled in accordance with the base advance angle determined by the base advance computing circuit 42.

While, in the embodiment described above, the presence of knock is determined by making a comparison between the base noise and the knock for every ignition, the presence of knock may be determined by a statistical process (for example, the presence of knock may be determined according to the percentage of knocks in every 100 times of ignition). In this case, however, there will be a delay in the response.

Figure 6:
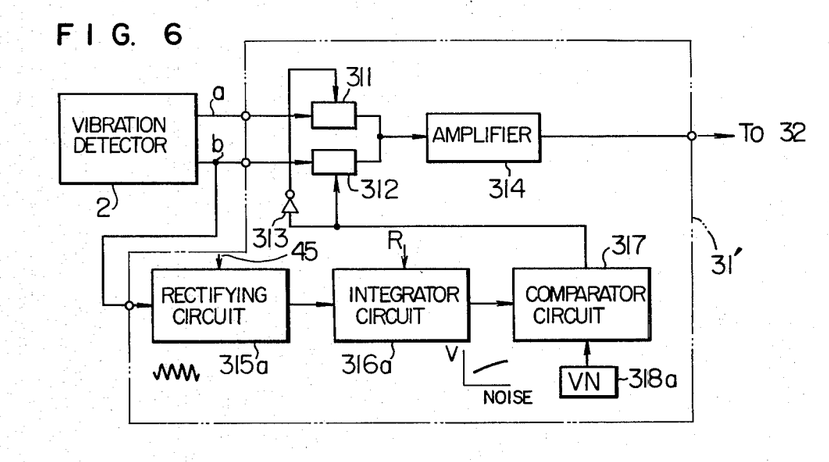

Further, while, in this embodiment, the selection between the output signals of the detector 2 is made in accordance with the engine speed in view of the fact that the low-frequency band vibration noise increases with an increase in the engine speed, a switching circuit 31' designed to effect the selection by detecting the level of vibration noise will now be described with reference to FIG. 6. In the Figure, the same reference numerals as used in FIG. 4 designate the same components. Numeral 315a designates a rectifying circuit for receiving and rectifying the output or the low-frequency band detection signal of the vibration detector 2 during the time that the vibration noise sampling signal from the dividing signal generating circuit 45 is at the "1" level, and 316a an integrator circuit for integrating and holding the output of the integrator circuit 315a. The integrator circuit 316a receives a reset signal R (this signal is produced in synchronism with the time or angle) which is generated just before the application of the next vibration noise sampling signal and it holds the data integrated during the time interval between just after the application of the reset signal R and just before the application of the next reset signal R. A comparator circuit 317 compares the output voltage V of the integrator circuit 316a with a predetermined noise level voltage $V_N$ from a voltage setting means 318a to generate an output. Thus, the vibration noise produced in the non-knocking time interval is detected so that if $V>V_N$, the output of the detector 2 is switched to the high-frequency band detection signal, whereas if $V<V_N$, the output is switched to the low-frequency band detection signal. The operation of the circuits following the switching circuit 31' is the same as described previously.

It has also been found that the engine vibration noise increases with an increase in the load. In this case, if the pressure in the intake pipe is detected, converted to a voltage proportional to the pressure and then applied to the input of the comparator circuit 317, it is possible to effect the selection between the signals in accordance with the intake pressure. Also, by using both the speed and load parameters, particularly by preparing a matrix of speed and load values, it is possible to select the switching conditions. This arrangement has the advantage of effecting the switching more minutely.

While, in the embodiment described above, the vibration detector 2 of the type having two resonant frequencies associated with different frequency bands has been described by way of example as applied to the piezoelectric element type, what is important to the detector is the fact that the detector has two resonant frequencies associated with different frequency bands and consequently this detecting principle can be incorporated in any type of detectors irrespective of their shape. Thus, it is evident that the detector 2 need not be mounted within a single container, and the detection may be accomplished by mounting to the cylinder two or more vibration detectors each having a separate resonance frequency. However, since the level of vibration varies depending on the mounting position, care must be given to the position and manner in which the detectors are mounted.

Figure 8:
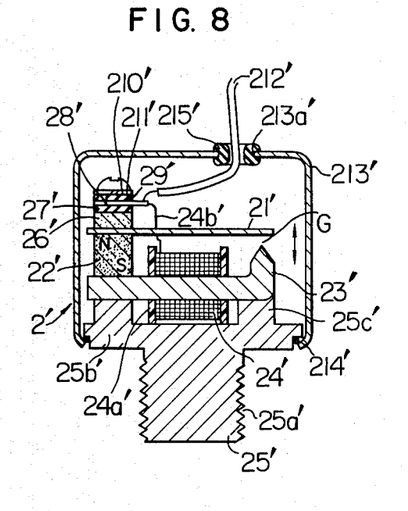
FIG. 8 is a longitudinal sectional view showing a second embodiment of the vibration detector.

A second embodiment of the vibration detector 2 adapted to magnetically detect knock will now be described. In FIG. 8 showing the construction of a detector 2', numeral 21' designates a pair of magnetic reed members (only one of them is shown) made of iron or iron-nickel alloy and each having a resonance frequency for resonating at a particular knocking frequency, 22' a magnet having a magnetic force, and 23' a core made of iron or iron-nickel alloy which forms, along with the reed members 21' and the magnet 22', a magnetic path. The magnetic path includes an air gap G provided between the reed members 21' and the core 23' and the opposing ends of the reed member 21' and the core 23' at the gap G are shaped into acute angle form. As a result, when the reed member 21' is vibrated in the direction of the arrow in the illustration, the gap G varies with the resulting variation in the magnetic reluctance of the magnetic path. Numeral 24' designates a coil for detecting the resulting variation in the magnetic flux. A coil bobbin 24a' is formed with a hole so that the core 23' is extended through its central portion and the coil conductor is wound around the outer surface of the bobbin 24'. The bobbin 24' is secured to the core 23' by such means as bonding so as to prevent the number of passing magnetic flux being varied by any change in the relative positions of the coil 24' and the core 23'. Numeral 25' designates a stay made of iron, brass or the like and including in the lower part a threaded portion 25a' for mounting the detector to the engine cylinder block and in the upper part supports 25b' and 25c' on which is mounted the core 23'. Numeral 26' designates a press bar for the magnetic path forming component parts which is firmly attached, along with insulating plates 27' and 29', a lug piece 28' to which is attached a coil output terminal 24b' and a washer 210', to the support 25b' of the stay 25' by means of a screw 211'. The coil output terminal 24b' is attached to the lug piece 28' by soldering, caulking or the like and it is then connected to the outside through a lead wire 212'. Numeral 213' designates a cover mounted by caulking on the stay 25' with a sealing member 214' of rubber or the like being held therebetween, and the cover 213' is formed with a hole 213a' through which the lead wire 212' is brought out. Numeral 215' designates a rubber bushing for holding the lead wire 212' in place. Two units of the vibration detecting means including the reed member 21', the coil 24', etc., are assembled side by side in independent relation to the supports 25b' and 25c' and the reed members 21' are different in length so as to be resonant at different frequencies from each other. The whole detector is firmly mounted in place by screwing the treaded portion 25' into the cylinder block, thus allowing the detector to vibrate along with the cylinder block.

With the vibration detector shown in FIG. 8, the knocking vibration of the cylinder block is transferred to each of the reed members 21' by way of the stay 25'. Thus the reed member 21' vibrates in accordance with the frequency and intensity of the knocking vibration as well as the natural vibration of the reed member itself. In this case, since the core 23', the coil 24' and the magnet 22' are assembled firmly so as to vibrate as a unit, the reed member 21' alone is caused to vibrate relatively in the magnetic path in response to the knocking vibration and thus the distance of the air gap G is varied in accordance with the knock. It is also designed so that a predetermined magnetic flux passes through the core 23' and the read member 21' and thus a change in the air gap G results in a change in the number of magnetic flux in the magnetic path. In other words, the knocking vibration is detected as a voltage. The detected voltage signal is supplied to the knock detecting circuit 3 through the lead wire 212'. The reed members 21' of the two magnetic detecting means are designed so that they have different lengths and usually their resonance frequencies with respect to the knocking frequencies (7 to 100 kHz) are selected respectively near 8 kHz and 12 kHz. Thus they have high knock detecting sensitivities to these frequency bands but show reduced sensitivities to the signals in the other frequency bands and thus the S/N ratios are improved.

Figure 9:
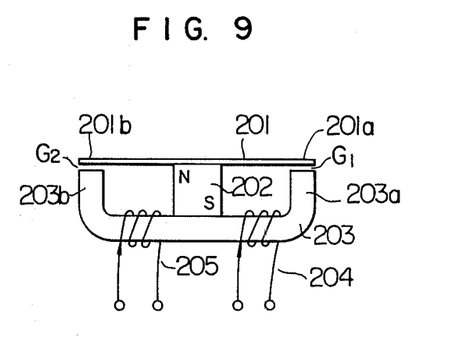
FIG. 9 is a schematic diagram showing the construction of a third embodiment of the vibration detector.

FIG. 9 is a diagram useful for explaining the principle of a third embodiment of the vibration detector in which the two magnetic paths are arranged in opposite positions instead of arranging the magnetic paths in parallel relation. In the Figure, numeral 201 designates a member equivalent to the reed members 21' having different resonance frequencies, and air gaps $G_1$ and $G_2$ are provided at the opposed positions. This reed member may be made of a single piece or it may be divided into two parts without giving rise to any difficulty, if the reed member is mounted firmly. Numeral 202 designates a magnet, and 203 a core made of a C-shaped magnetic material. One magnetic flux flows through a path comprising the north pole of the magnet 202, one side 201a of the reed member 201, the gap $G_1$ and one side 203a of the core 203, and the other magnetic flux flows through another path comprising the north pole of the magnet 202, the other side 201b of the reed member 201, the gap $G_2$ and the other side 203b of the core 203. Numerals 204 and 205 designate coils wound on the core 203 in the two magnetic paths. In this case, the resonance frequencies can also be changed by changing the lengths of the two sides of the reed member 201.

In addition to the previously mentioned detectors for detecting knock, any of detectors of the photoelectric type and other types employing other detecting principles may be used provided that the detector has the necessary resonance frequencies and is capable of detecting the vibrations of an engine. It is evident that in addition to the knock discriminating means used in the described embodiment, any of other types (e.g., one which does not detect base noise or other which discriminates the knock from the average value of the base noise and the peak value of the vibration) may be used. Further, while the signal switching circuit includes analog switches, any of other switching means of the type employing contact type switches, etc., may be used. In this case, however, care must be given to the response characteristic and the insulating properties.

Still further, while, in the above-mentioned embodiment detectors, each of the low and high frequency bands is associated with a single resonance frequency, one of the frequency bands may be associated with two or more resonance frequencies so as to effect selection between the high and low frequency bands.

On the other hand, the detection of knock can also be accomplished with improved S/N ratio under all the engine operating conditions by means of a vibration detector which detects the engine knocking vibrations and a plurality of band-pass filters which will be selectively operated in accordance with the engine operating conditions so that the low-frequency band filter characteristic is used when the engine vibration noise is relatively low and the S/N ratio of knock signals is improved in the low frequency band and the high-frequency band filter is used when the vibration noise increases.

Figure 10:
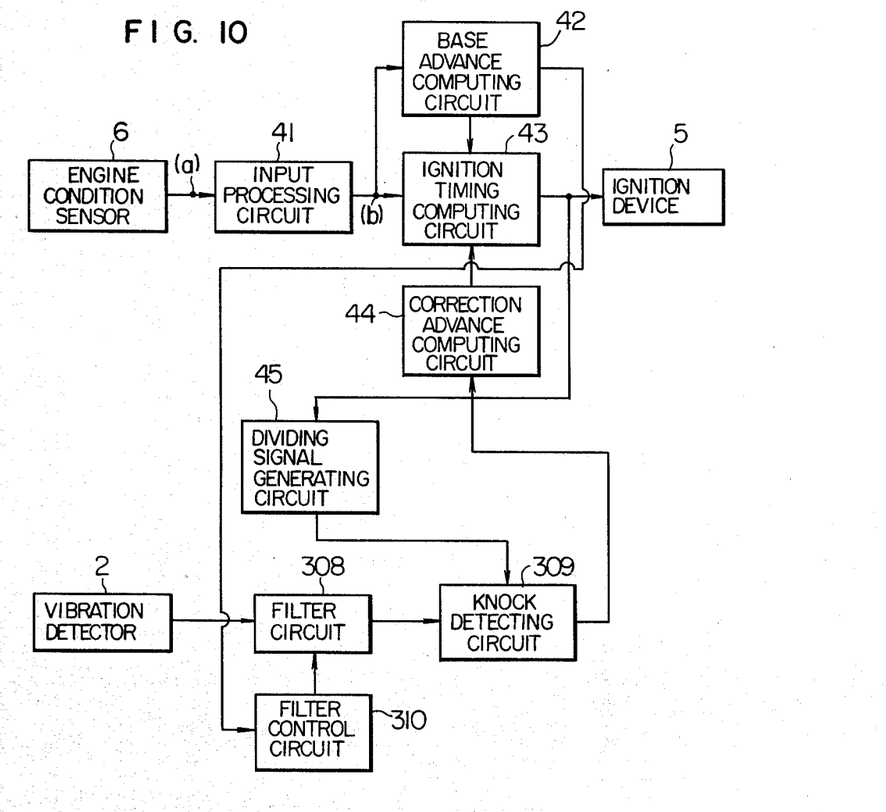
FIG. 10 is a block diagram showing a second embodiment of the knock feedback ignition system incorporating the apparatus of this invention.

FIG. 10 is a block diagram showing a second embodiment of the knock feedback ignition system incorporating the apparatus of this invention. In the Figure, those component parts designated by the same reference numerals as used in FIG. 4 have the same or equivalent functions. In FIG. 10, numeral 308 designates a filter circuit which receives the output signals of a vibration detector 2 and has a plurality of band-pass filter characteristics and in which the filters are selectively operated by externally applied signals. In the embodiment of FIG. 10, it is assumed that there are two band-pass filter characteristics of 7 to 10 kHz (low frequency) and 11 to 13 kHz (high frequency band). Numeral 309 designates a knock detecting circuit responsive to the high frequency signal applied through the filter circuit 308 to determine whether knock is present. Numeral 310 designates a filter control circuit for changing the filter characteristics of the filter circuit 308 in accordance with the engine speed.

The detailed circuit construction of the system shown in FIG. 10 will now be described with reference to FIGS. 11 and 12 with the aid of FIG. 14. In the ignition timing computing circuit 43 shown in FIG. 11, a reference potential $V_{ref}$ is produced from the dividing point of a pair of resistors (not shown) which are connected in series between the power source and the ground and the potential is applied through bias resistors to operational amplifiers which will be described later. The ignition timing computing circuit 43 further comprises a NOT circuit 441, dividing resistors 442 and 443 for determining a discharge controlling potential, analog switches 444, 445 and 446 adapted to be turned on by a "1" level signal, charge resistors 447 and 448, a discharge resistor 449, bias resistors 410 and 411 connected to the reference potential $V_{ref}$, an input resistor 412, operational amplifiers 413 and 414, a capacitor 415 and an AND circuit 416. The resistors 447, 448, 449 and 410, the capacitor 415 and the operational amplifier 413 form a Miller integrator circuit in which the capacitor 415 is charged when the input voltage is lower than the reference potential $V_{ref}$ and the capacitor 415 is discharged when the input voltage is higher than the reference potential $V_{ref}$. The resistors 411 and 412 and the operational amplifier 414 form a comparator circuit. The analog switches 444, 445 and 446 may each suitably be comprised of a field-effect transistor.

Figure 14:
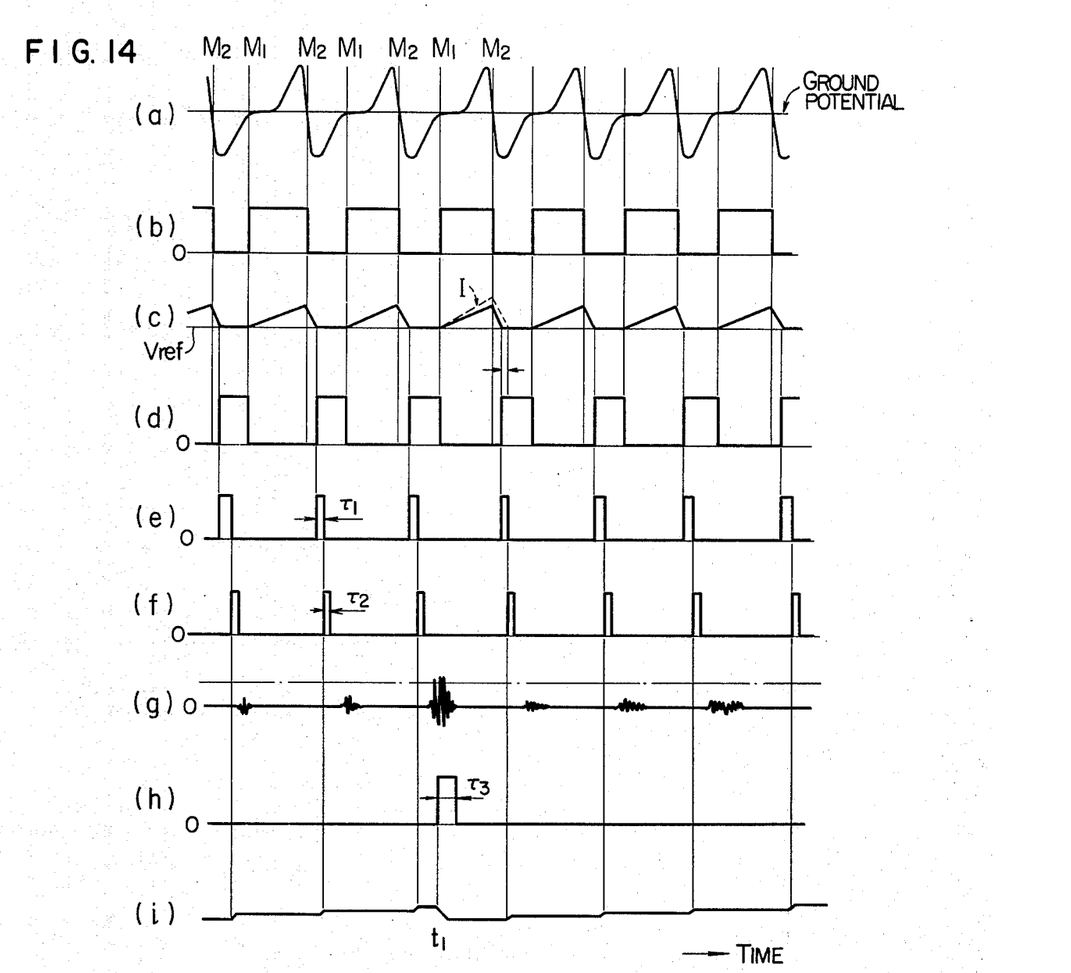
FIG. 14 is a waveform diagram useful in explaining the operation of the system shown in FIG. 10.

Although not shown in detail, if, for example, the engine speed is to be detected as a parameter for indicating the engine condition, the engine condition sensor 6 may be of the known type comprising a rotor mounted on the distributor shaft of a four-cylinder engine and having four projections formed on its periphery at equal spaces and an electromagnetic pickup positioned to face the rotor projections, whereby the rotor makes one rotation for every two rotations of the crankshaft so that the electromagnetic pickup generates a signal which goes to the ground potential as shown in (a) of FIG. 14 when each of the rotor projections passes the electromagnetic pickup, and the output signal of the electromagnetic pickup is generated as an output signal of the engine condition sensor 6. The output signal of the engine condition sensor 6 is coupled to an input processing circuit 41 which in the present embodiment comprises a comparator circuit and functions as a waveform reshaping circuit and the signal is compared with the reference potential or the ground potential thereby generating a rectangular wave signal shown in (b) of FIG. 14. In this case, the rectangular wave signal detects crankshaft rotational positions $M_1$ and $M_2$ for each cylinder.

Figure 11:
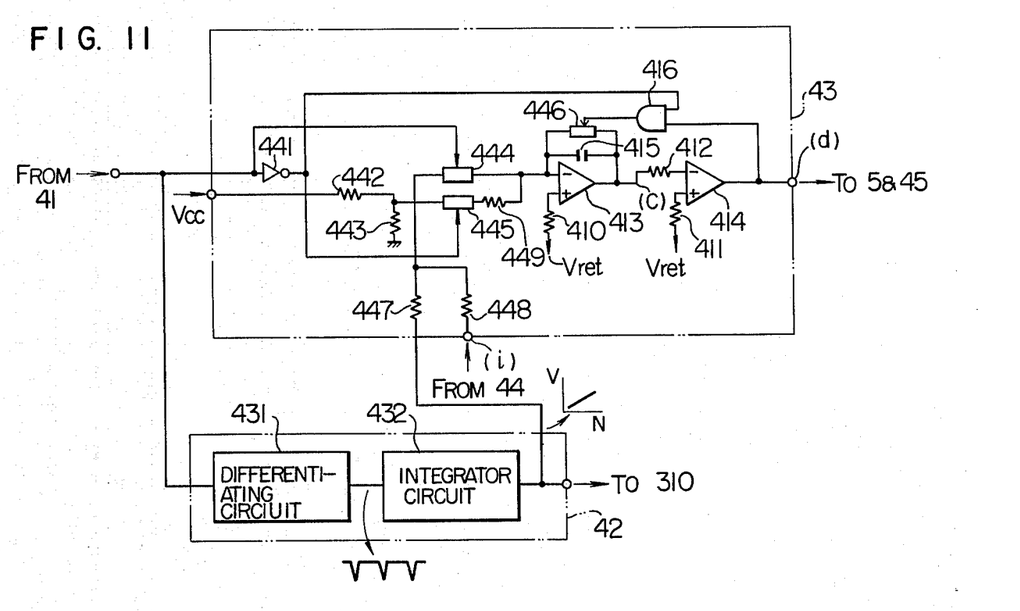
FIGS. 11, 12 and 13 are circuit diagrams showing in detail the construction of the system shown in FIG. 10.

As shown in FIG. 11, a base advance computing circuit 42 is designed so that the output signal of the waveform reshaping circuit 41 is applied to an integrator circuit 432 through a differentiating circuit 431 so that an analog voltage is produced which increases with an increase in the engine speed N and the voltage is coupled to the charge resistor 447 of the ignition timing computing circuit 43. The other charge resistor 448 of the ignition timing computing circuit 43 is connected to a correction advance computing circuit 44. The output of the integrator circuit 432 in the base advance computing circuit 42 is also connected to the filter control circuit 310 which will be described later.

Figure 12:
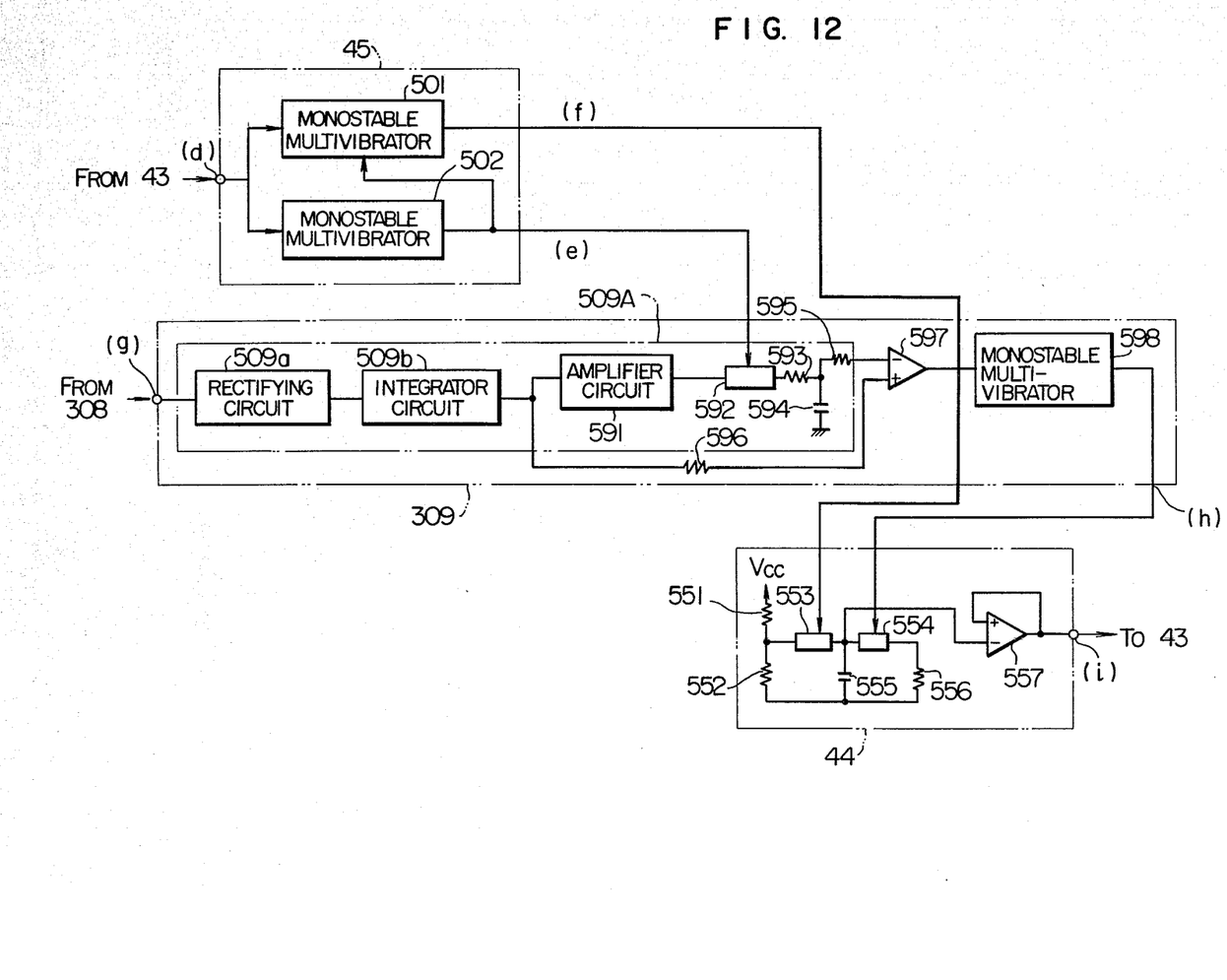

Referring now to FIG. 12, a dividing signal generating circuit 45, the knock detecting circuit 309 and the correction advance computing circuit 44 will be described. The dividing signal generating circuit 45 receives the output signal of the ignition timing computing circuit 43 and it comprises monostable multivibrator 501 and 502. The monostable multivibrator 502 generates, in response to the positive-going transition of the output signal from the ignition timing computing circuit 43, a signal having a time width $\tau_1$ ($\tau_1$ is the duration of "1" level) as shown in (e) of FIG. 14, and in response to the negative-going transition of the output from the monostable multivibrator 502 the other monostable multivibrator 501 generates a signal having a time width $\tau_2$ ($\tau_2$ is the duration of "1" level) as shown in (f) of FIG. 14.

Applied to the knock detecting circuit 309 from the vibration detector 2 through the filter circuit 308 is a vibration waveform output in the predetermined band width of the filter characteristic corresponding to the engine condition (in this embodiment either one of bands 7 to 10 kHz and 11 to 13 kHz) as shown in (g) of FIG. 14. In FIG. 12, the knock detecting circuit 308 comprises a rectifying circuit 509a for full-wave or half-wave rectifying the output signal of the filter circuit 308, an integrator circuit 509b for integrating and averaging the output of the rectifying circuit 509a, an amplifier circuit 591 for amplifying K times the output signal of the integrator circuit 509b, an analog switch 592, a hold circuit (comprising resistors 593 and 595 and a capacitor 594), a comparator circuit 597 for comparing the output of the hold circuit with the input signal applied through a resistor 596 and a monostable multivibrator 598. The hold circuit is designed so that when the analog switch 592 is turned on for the time $\tau_1$, the resulting output potential of the amplifier 591 charges the capacitor 594. The rectifying circuit 509a, the integrator circuit 509b, the amplifier circuit 591, the analog switch 592, the resistors 593 and 595 and the capacitor 594 form an average value output circuit 509A. The output signal of the hold circuit is K times the initial signal. When the input signal of the integrator circuit 509b is higher than the output signal of the hold circuit, the comparator circuit 597 generates a "1" level output and the monostable multivibrator 598 generates, in response to the transition to the "1" level of the output from the comparator circuit 597, an output signal having a time width $\tau_3$ as shown in (h) of FIG. 14. In other words, when the input signal is higher than the value which was held for the time width $\tau_1$, this output signal having the time width $\tau_3$ is generated.

The correction advance computing circuit 44 comprises resistors 551, 552 and 556, analog switches 553 and 554, a capacitor 555 and an operational amplifier 557, and one end of the resistor 551 is connected to the positive supply terminal ($V_{cc}$). The analog switch 553 is opened only for the duration of the time $\tau_2$ to charge the capacitor 555, and the analog switch 554 is opened only in response to the generation of an output pulse from the knock detecting circuit 309 so that the capacitor 555 discharges through the resistor 556 and the capactor potential decreases. The operational amplifier 557 forms a voltage follower circuit for effecting current amplification.

Figure 13:
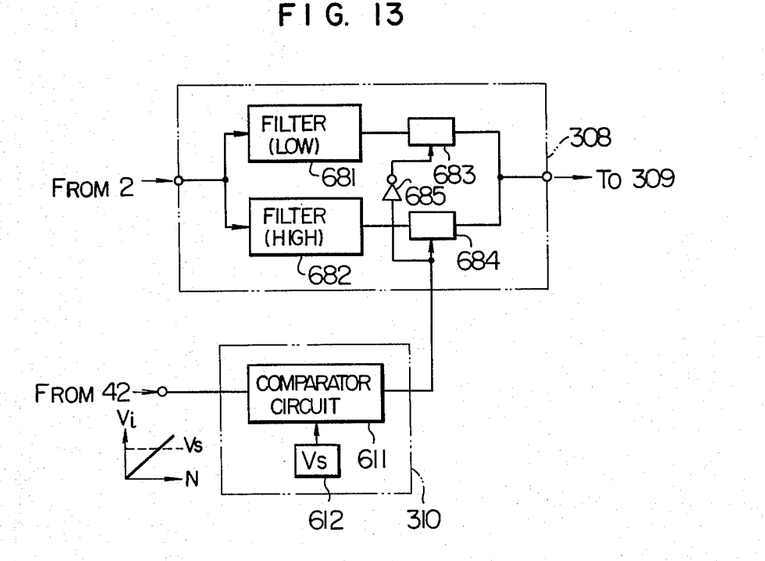

As shown in FIG. 13, the filter circuit 308 comprises a pair of band-pass filters 681 and 682 respectively having bands of 7 to 10 kHz and 11 to 13 kHz, analog switches 683 and 684, and a NOT gate 685, whereby the filter constant for the output of the vibration detector 2 is changed to a low filter value (7 to 10 kHz) or a high filter value (11 to 13 kHz) in accordance with the output of the filter control circuit 310. As shown in FIG. 13, the filter control circuit 310 comprises voltage setting means 612 and a comparator circuit 611 for receiving the output voltage $V_s$ of the voltage setting means 612 and the output voltage $V_i$ of the integrator circuit 432 which is indicative of the engine speed, whereby depending on whether the engine speed is higher than a predetermined value, a control signal is generated to close one or the other of the analog switches 683 and 684.

Next, the operation of the above-described detailed embodiment as well as the engine operating conditions will be described. Through the input processing circuit 41 serving as a waveform reshaping circuit the engine condition sensor 6 generate a rectangular pulse in synchronism with the rotation of the engine crankshaft and an output is generated at an output terminal b which goes to the "1" level for the time interval between $M_1$ and $M_2$ and to the "0" level during the time interval between $M_2$ and $M_1$ as shown in (b) of FIG. 14, thus generating an output consisting of two pulses of two pulse periods per engine revolution. When the output of the input processing circuit 41 goes to the "1" level, the analog switch 444 of the ignition timing computing circuit 43 is turned on. In this case, the output of the NOT circuit 441 goes to the "0" level so that the analog switch 445 is turned off. Also the output of the AND circuit 416 goes to the "0" level so that the capacitor resetting analog switch 446 is turned off and the capacitor 415 is charged from the reference potential $V_{ref}$ in accordance with the voltages applied to the charge resistors 447 and 448 from the time of $M_1$ as shown in (C) of FIG. 14. The output of the operational amplifier 413 exceeds the reference potential $V_{ref}$ by the charging of the capacitor 415 and the output of the comparator circuit goes to the "0" level as shown in (d) of FIG. 14.

Then, when the signal at the output terminal of the input processing circuit 41 goes to the "0" level at the time $M_2$, the analog switch 444 is turned off and simultaneously the analog switch 445 is turned on. Thus, the capacitor 415 starts discharging with a constant discharge current corresponding to the output of the discharge controlling dividing resistors 442 and 443 as shown in (c) of FIG. 14. When the discharge of the capacitor 415 is completed so that the operational amplifier 413 becomes lower than the reference potential $V_{ref}$, the output of the comparator circuit goes to the "1" level as shown in (d) of FIG. 14 and the output of the AND circuit 416 goes to the "1" level. Thus the analog switch 446 is turned on and the output of the operational amplifier 413 is maintained constant at the reference potential $V_{ref}$ as shown in (c) of FIG. 14. This signal at the output terminal of the ignition timing computing circuit 43 is applied to an ignition device 5 and an ignition spark is produced in response to the positive-going transition of the signal. The time of this positive-going transition is determined by the charging and discharging currents of the capacitor 415. Since the discharging current is fixed, the time is dependent on the charging current alone. When the charging current increases, the capacitor potential increases as shown by the dotted line I in (c) of FIG. 14 and consequently the output of the comparator 414 goes to the "1" level later when the charging current is lower. Namely, the ignition timing is retarded. On the contrary, when the charging current decreases, the capacitor potential decreases and the spark ignition timing is correspondingly advanced.

In this case, the charging current is determined by the charge resistors 447 and 448 and the potential thereacross (the resistors 447 and 448 form an adder circuit). For instance, if the output potential of the correction advance computing circuit 44 is constant, the time of positive-going transition for the comparator 414 is varied by the output potential of the base advance computing circuit 42. In this case, it is arranged so that the output potential of the base advance computing circuit 42 increases with the engine speed (the charging current of the capacitor 415 decreases) and consequently the time of positive-going transition is advanced with an increase in the engine speed. In other words, by preliminarily programming the base advance computing circuit 42, it is possible to determine the advance angle as desired. On the contrary, if the output potential of the base advance computing circuit 42 is constant, the ignition timing will be retarded or advanced depending on the output potential of the correction advance computing circuit 44 so that the ignition timing is retarded with a decrease in the output potential and the ignition timing is advanced as the output potential increases. It is to be noted here that it is necessary to set so that on discharge the reference potential by the dividing resistance of the resistors 442 and 443 becomes higher than $V_{ref}$ and the dividing resistor impedance becomes lower than the discharge resistor 449 and on charge the output potentials of the base and correction advance computing circuits 42 and 44 and the added potential of the resistors 447 and 448 become lower than $V_{ref}$. In addition, the base and correction advance angles are weighted by the resistors 447 and 448.

The knock detecting circuit 309 (FIG. 12) is so designed that the capacitor 594 holds a value which is indicative of K times the averaged voltage value of the base vibration waveform during the time $\tau_1$ in (e) of FIG. 14 after the ignition, and the thus held value is compared with the output of the integrator circuit 509b. When there is no occurrence of knock, the held value is always greater than the integrator output, and when knock occurs, the output value of the integrator circuit 309b becomes greater than the held value near the top dead center with the result that the output of the comparator circuit 597 goes to the "1" level and the monostable multivibrator 598 generates a knock pulse having a time width $\tau_3$ as shown in (h) of FIG. 14. The time width $\tau_1$ will now be described. The time width $\tau_1$ determines the amount of each correction advance by the capacitor 555 and examination of the results of various experiments has shown that the time width $\tau_1$ must be selected less than 3 msec since no knocking vibration is produced during the time interval of 3 msec between the ignition and near before the top dead center. It has also been determined by examination of the various experimental results that in terms of crank angle degrees, the time width $\tau_1$ must be set to less than 60° crank angle from the ignition.

Next, the correction advance computing circuit 44 will be described. With no knock occurring, only the analog switch 553 is turned on during the time width $\tau_2$ so that the capacitor 555 is charged with the divided voltage V by the resistors 551 and 552 and the terminal voltage of the capacitor 555 increases with the resulting increase in the output of the voltage follower circuit formed by the operational amplifier 557. When this occurs, the output of the correction advance computing circuit 44 increases as shown in (i) of FIG. 14 so that the output c of the integrator circuit in the ignition timing computing circuit 43 decreases the charging current and the ignition timing is advanced in relation to the preliminarily programmed value. On the contrary, when knock occurs, the analog switch 554 is turned on so that the charge on the capacitor 555 is discharged through the resistor 556 and the output of the correction advance computing circuit 44 decreases in potential as shown at $t_1$ in (i) of FIG. 14. This increases the charging current of the capacitor 415 in the integrator circuit of the ignition timing computing circuit 43 and the ignition timing is retarded. When the ignition timing is retarded so that there is no longer any knocking, only the analog switch 553 is turned on with the result that the capacitor 555 is again charged and the ignition timing is advanced. In this way, the ignition timing is retarded upon occurrence of knocking and when the occurrence of knock stops the ignition timing is again advanced so as to control the ignition timing in an advance condition which is free of knocking. The amount of correction for each advancement or retardation of the ignition timing can be determined by the resistors 551, 552 and 556 and the time width $\tau_2$ and $\tau_3$.

Figure 15:
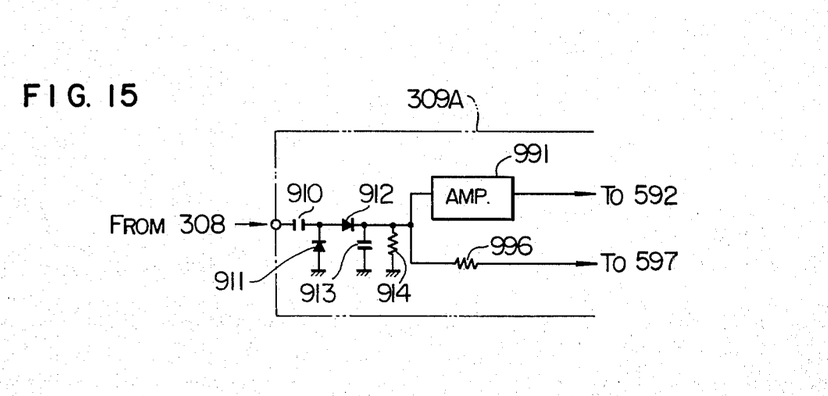
FIG. 15 is a circuit diagram showing the principal part of another embodiment of the knock detecting circuit used in the system shown in FIG. 10.

While, in the above-described embodiment, the base signal of the knock detection signal is obtained from the output of the integrator circuit 509b integrated during the time width $\tau_1$, in the embodiment of FIG. 15 the detection is accomplished by means of a waveform derived by rectifying and averaging as a preprocessing the output of the filter circuit 308. In this case, the output of the filter circuit 308 is directly applied to a voltage doubling averaging circuit comprising capacitors 910 and 913, diodes 911 and 912 and a resistor 914 from which it is coupled to an amplifier circuit 991 and a resistor 996, and the same computation as mentioned previously is performed. In this case, a better result will be obtained due to reduction in noise signals such as ignition noise. However, the determination of the time constants for averaging purposes will be made more difficult.

Next, the operation of the principal parts of the invention, i.e., the filter circuit 308 and the filter control circuit 310 will be described in detail. The comparator circuit 611 compares the output voltage $V_s$ of the voltage setting means 612 preset to a predetermined engine speed (e.g., 2500 rpm) with the output voltage $V_i$ of the integrator circuit 432 indicative of the engine speed, so that if $V_i > V_s$, it is determined that the engine speed is high and the engine vibration is high with the resulting deterioration of the S/N ratio and the connections are made to the high band-pass filter 628 having a better S/N ratio. More specifically, the output of the comparator circuit 611 goes to the "1" level so that the analog switch 684 is turned on and the output of the filter 682 is applied to the knock detecting circuit 309 which in turn detects the presence of knock from the knock component in the high frequency band of 11 to 13 kHz. In this case, the output of the NOT gate 685 goes to the "0" level and the analog switch 683 is turned off. When $V_i < V_s$, in the reverse way than previously, the low frequency band-pass filter 681 comes into operation. Thus, the detection of knock can always be effected despite the increased engine vibration noise.

In the embodiments described above, of the engine condition parameters the engine speed parameter is used to effect the filter selection. Next, the selection of the filters in accordance with the vibration noise generation level itself will be described. If the vibration noise output (the output voltage of the capacitor 594) sampled by the $\tau_1$ signal is applied, in place of the engine speed, to the input of the filter control circuit 310, instead of using an indirect selection setting such as the engine speeds, the vibration noise can be directly detected to automatically effect the filter selection to meet the deteriorated S/N ratio of the knock signal due to the increase in the level of the engine vibration noise. In operation, when the noise level increases, comparison of the voltage corresponding to the noise level with the noise level voltage $V_s$ preset in the voltage setting means 612 causes the comparator circuit 611 to generate a "1" level output. Thus the high frequency filter output of the filter 682 is applied to the knock detecting circuit 309 which in turn detects the knock with an improved S/N ratio. When the knock level voltage is lower than the preset voltage $V_s$, the reverse operation takes place.

The vibration noise level also varies in dependence on the engine load condition (the noise tends to increase with an increase in the load). Thus, the engine load condition (e.g., the intake vacuum of less than $-150$ mmHg) may be detected as an engine condition parameter by an intake pressure sensor (not shown) or by means of a throttle position signal to apply the resulting signal to the filter control circuit 310. In addition, the same operation can be performed by applying a plurality of parameters (engine speed, intake vacuum, etc.) as the filter selecting conditions.

Further, while, in the embodiments described above, the invention is applied to the analog type ignition timing control system, the similar construction may be realized by means of a digital control type apparatus employing a microcomputer or the like.

Further, while, in the above embodiments, the detection of knock is accomplished by the comparison method in which the base noise is compared with the averaged and integrated value of the knock output, in view of the fact that the gist of the invention resides in the selection of the filter characteristics for the vibration detector, from the principle point of view the same effect can be obtained by another knock detection method simply using the comparison of signal levels and any of other methods. Further, by using a statistical knock discriminating method (e.g., the detection of the percentage of knocks in every 100 times of ignition), it is possible to further improve the detection accuracy, although the detection time increases.

Further, while in the above embodiments, no description has been made of the vacuum advance for adjusting the engine load advance angle in accordance with the intake pressure, in fact the necessary means is provided for detecting the pressure in the intake pipe and controlling the advance angle in accordance with the detected pressure, though no description has been made of this means.

Further, while, in the above embodiment, the band-pass filters are used, it is possible to use a high-pass filter and a low-pass filter as occasions demand.

We claim:

1. A knock detecting apparatus for an internal combustion engine in which a combustible mixture is ignited by an ignition spark and ignition control means for controlling a timing of said ignition spark, said detecting apparatus comprising:

first means responsive to knocks of said engine at around a predetermined first frequency and effective to produce a first knock output signal indicative of said engine knocks;

second means responsive to knocks of said engine at around a predetermined second frequency and effective to produce a second knock output signal indicative of said engine knocks, said second frequency being lower than said first frequency;

means responsive to an operating condition of said engine and effective to produce a condition output signal indicative of said operating condition; and means responsive to said condition output signal and effective to selectively apply one of said first and second output signals to said ignition control means to thereby control said timing of ignition spark, said first and second output signals being selected in response to said condition output signals being selected in response to said condition output signal indicating that said operating condition is higher and lower than a predetermined reference value, respectively.

2. A knock detecting apparatus according to claim 1, wherein each of said first and second means comprises:

a reed member supported at one portion thereof in a securely fixed relation to said engine and having a respective predetermined length from said one portion to a free end portion thereof; and a transducer for converting mechanical movement of said reed member caused by said engine into an electrical output signal.

3. A knock detecting apparatus according to claim 1, wherein said first and second means comprises:

a transducer securely fixed to said engine for converting said knocks of said engine into an electric output signal;

a first band pass filter for passing only a first signal component of said electric output signal, said first signal component having frequencies at around said first frequency; and a second band pass filter for passing only a second signal component of said electric output signal, said second signal component having frequencies at around said second frequency.

4. A knock detecting apparatus according to claim 2 or 3, wherein said condition responsive means comprises:

rotation sensor means for sensing a rotation speed of said engine.

5. A knock detecting apparatus according to claim 2 or 3, wherein said condition responsive means comprises:

load sensor means for sensing a load of said engine.

6. A knock detecting apparatus according to claim 2 or 3, wherein said condition responsive means comprises:

background noise responsive means for sensing a background noise included in said first and second output signals.

* * * * *